United States Patent [19]

Sica, Jr.

[11] 4,023,906
[45] May 17, 1977

[54] COMPACT THREE-BEAM INTERFEROMETER

[75] Inventor: Louis Sica, Jr., Alexandria, Va.

[73] Assignee: The United States of America as represented by the Secretary of the Navy, Washington, D.C.

[22] Filed: June 11, 1976

[21] Appl. No.: 695,298

[52] U.S. Cl. ............................................. 356/113
[51] Int. Cl.² ......................................... G01B 9/02
[58] Field of Search ........................... 356/107, 113

[56] References Cited

UNITED STATES PATENTS 3,487,227  12/1969  Kinzly .......................... 356/111 X

OTHER PUBLICATIONS

Sica, "Three Beam Interferometer for the Observation of Kinetic Coolin in Air", *Applied Optics*, vol. 12, No. 12, pp. 2848–2854, Dec. 1973.

*Primary Examiner*—John K. Corbin
*Assistant Examiner*—Matthew W. Koren
*Attorney, Agent, or Firm*—R. S. Sciascia; Philip Schneider; Melvin L. Crane

[57] ABSTRACT

An interferometer which retains the lateral vibration rejection capability of a three-beam interferometer and maintains a large work space between the beams while improving longitudinal vibration noise rejection. The system makes use of beam splitting assemblies which split the source laser beam into three beams and then recombine the beams. The recombination assembly includes wedges which introduce a small angle between the outer beams so that a small number of fringes are formed across the diameter of the beam.

2 Claims, 2 Drawing Figures

COMPACT THREE-BEAM INTERFEROMETER

BACKGROUND OF THE INVENTION

This invention relates to an interferometer and more particularly to a compact three-beam interferometer.

Heretofore interferometers have been made with various different optical-detector arrangements. Three-beam interferometers have been set forth in the prior art in U.S. Pat. No. 3,487,227 in which three collinear apertures were placed in front of a lens producing an interference fringe pattern in the focal plane of the lens from monochromatic light passing through the three apertures. Another three-beam interferometer has been set forth in an article "Three Beam Interferometer for the Observation of Kinetic Cooling in Air", by L. Sica; *Applied Optics*, Vol. 12, pages 2848–2854, December 1973.

In the patented device, relative longitudinal vibration of the lens and detector slit cause optical path changes; i.e., noise in the center beam relative to the edge beams which appears along with the signal output. In the device of the published article, longitudinal vibrations are also confused with the output signal.

SUMMARY OF THE INVENTION

This invention makes use of two optical assemblies in which the optical elements of each assembly are joined together to provide a rigid optical assembly in which an incident laser beam is divided into three optical beams. The two outer beams travel equal distances in the optical elements and the three beams are focused onto a Ronchi ruling at the focal plane. The arrangement of optical elements results in low sensitivity to longitudinal vibrations which constitutes the main improvement of this invention.

Figure 1:
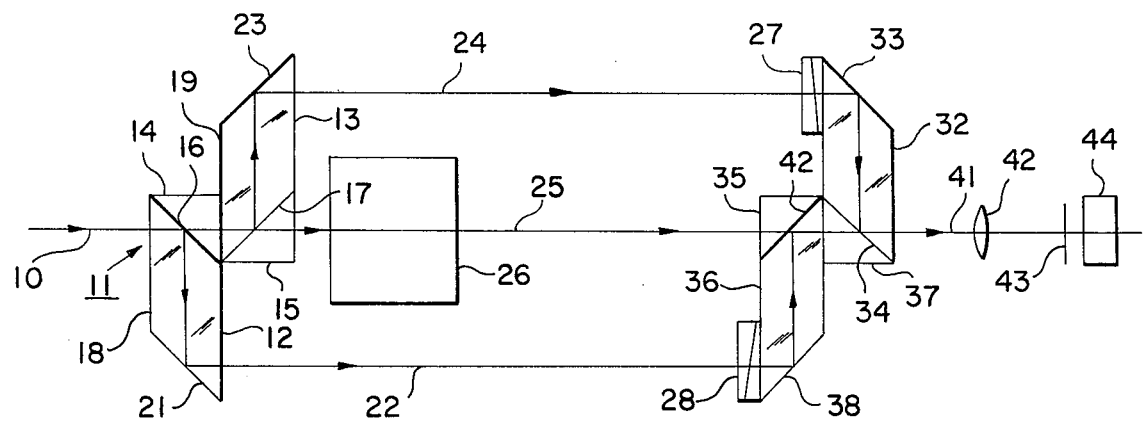
FIG. 1 illustrates a schematic of the various elements of the system.

Now referring to the drawing, there is shown by illustration a schematic diagram of a compact three-beam interferometer made in accordance with the teaching of this invention. A laser beam 10 is incident onto a beam splitter 1 which comprises two 45° angle rhombohedrons (rhomb) 12, 13, each of which have an isosceles right angle prism 14, 15 cemented to the beam splitting surfaces 16, 17. (The optimum reflectivity at the beam splitting surfaces equals about 27%). The laser beam enters one side of the rhomb 12 normal to the surface 18 opposite the beam splitter surface 16. Some of the radiation incident on the beam splitter surface 16 is reflected along the length of the rhomb 16 to the opposite end 21 which reflects the beam normal to the incident beam in a beam path 22. The radiation that passes through the beam splitter end 16 passes through one side of the isosceles right angle prism 14 and is incident on side 19 of the rhomb 13. The radiation enters the rhomb 13 through side 19 and is incident on the beam splitter end 17 of rhomb 13 which reflects a portion of the beam along the length of the rhomb 13 to the end 23 which reflects the incident radiation normal to the beam path through the rhomb. The radiation is refluxed out of the rhomb 13 in a beam 24 which is parallel with the beam 22 reflected from rhomb 12. The incident radiation that passes straight through the beam splitter passes out through the isosceles right prism 15 in a beam 25 parallel with beams 22 and 24. The central beam 25 passes through a modulator 26 which modulates the beam 25, as desired.

A second assembly, which is a duplicate of the first assembly with the exception of adjustable wedges 27, 28, is positioned in optical alignment with the first assembly. Each of the wedges has a small apex angle and they are placed one each in each of the outer beam paths 22 and 24. The second assembly recombines the three beams into a single output beam which includes a small number of fringes across the diameter of the beam introduced by the wedges.

The upper beam passes through wedge 27 and one face of rhomb 32 and is incident on rhomb face 33 which reflects the beam along the length of the rhomb to the beam splitter end 34 which reflects the beam out of the rhomb along the output path. The center beam 25 passes through the modulator 26, through one face of the isosceles right angle prism 35 on rhomb 36, and through the isosceles right angle prism 37 secured to the end of rhomb 32 and through the beam splitter end 34 of rhomb 32 and out along the output beam. The lower beam is incident on wedge 28 secured to the surface of rhomb 36, passes through the wedge, and is reflected along the length of rhomb 36 by the end surface 38. The beam is incident on the beam splitter end 42 of rhomb 36 and is reflected out through the rhomb face, the isosceles right angle prism 37, and out of the rhomb along the output beam 41. The combined output beam passes through a microscope objective lens 42 and is focused onto a Ronchi ruling 43 and then onto a pin diode detector 44.

The wedges introduce a small angle between the outer beams so that some small number of fringes are formed across the diameter of the output beam. These fringes are reimaged on the Ronchi ruling so that their size may easily be adjusted to the size of the ruling. Also a variation of the location of the observation plane imaged by the objective lens serves as an adjustment of the fringes of the interferometer since the small angle between the beams produces an effective depth of focus which is large but finite. The great depth of focus results in low sensitivity to longitudinal vibrations.

The wedges 27 and 28 are formed of matched pairs of wedged plates in which the components are adjustable relative to each other. The deflection of the beams may then be adjusted by rotation of one wedge section with respect to the other section of the pair; as well as by rotation of one pair with respect to the other pair. Small inaccuracies in the interior angles of the other components of the system may be compensated by adjustment of the beam directions through adjustment of the wedges. It has been determined that transverse vibrations of the second assembly produce small lateral displacements of the fringes due to the presence of the wedges; however, these lateral motions of the fringes have no effect on the system output.

Obviously small rotational vibrations of the two assemblies of components produce relative optical path changes in the center beam relative to the edge beams; however, these are proportional to the square of the angular displacement and are therefore small. The wedges permit adjustments which take into account the slight misalignment between the laser source and the other components necesssary to prevent reflected light from reentering the laser thereby preventing noise in the output due to reflected radiation.

In assembly of the elements the prisms may or may not be cemented to the rhombs. For a temporary setup, the elements may be held together. However, for a permanent setup the elements should be cemented together with an optical cement which will not interfere with passage of the radiation and will be able to withstand the heat without discoloration. Also, in assembly, either the surface of the rhomb or the surface of the prism must have the proper semireflecting coating to form the beam splitting and reflecting surfaces.

The above described assembly provides stability due to the fact that all three beams propagate through the same solid components. Further, the assembly is insensitive to lateral vibrations, while at the same time it has the advantage that the device is substantially insensitive to longitudinal vibrations and is very compact. The compactness leads to ease of vibration isolation, and insolation for temperature homogeneity. The device is easy to assemble because the elements mount solidly since they are small and lie flat.

Figure 2:
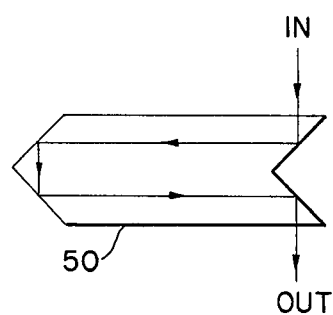
FIG. 2 illustrates a beam delay device usable with the device shown by illustration in FIG. 1.

In the event a laser is used in which the cavity length of the laser is not well stabilized, it is advisable that an optical delay line be placed in the path of the center beam in order that the center beam path be equal to the path of the outer beams. In this case the geometrical size and index of refraction of the delay device must be consistent with the dimensions and optical indices of the main device. FIG. 2 illustrates a schematic of a suitable optical element 50 which will provide a suitable beam delay. Small changes of angular orientation of the path equalization component can be used to introduce differential path changes in the center beam so as to adjust the fringes of the interferometer for maximum sensitivity.

A thin parallel plate may be inserted in the center beam and small rotations about the normal used for interferometer fringe adjustment without any attempt at path equalization between the center and the edge beams.

In the use of either of these fringe adjustment devices, the angle of incidence at the front surface should not be appreciably larger than the minimum necessary to prevent a reflection back into the laser so as to minimize the contribution of the ambient rotational noise motion of the component to system noise.

The specification of the optical precision of the rhombs and prisms making up the beam divider and combiner assemblies can be adjusted to the amplitude of vibration which the interferometer is called upon to reject. If the amplitude is large, components of much higher quality are required than if it is small. Calculations are based on the angle of the effective wedge oscillating in the center beam as a result of the vibrations. When the components are mathematically perfect, the wedge angle is zero and physical translational oscillations of the components have no effect except for the longitudinal motion of the beam combiner assembly. The effect of beam combiner motion depends on the number of fringes which have been adjusted into the field.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A compact three-beam interferometer which comprises:
   a beam splitting assembly;
   said beam splitting assembly comprising first and second identical rhombohedrons;
   said rhombohedrons having respectively, first and second beam splitting end surfaces with a 45° angle, with an isosceles right angle prism secured to the beam splitting end of each rhombohedron,
   said beam splitting ends of each rhombohedron assembled to form a 90° angle, with one face of said isosceles right angle prism secured to said first rhombohedron secured to one face of said second rhombohedron opposite from said beam splitting end thereof;
   a beam recombination assembly positioned in optical alignment with said beam splitting assembly,
   said recombination assembly comprising third and fourth rhombohedrons which respectively include third and fourth beam splitting end surfaces and as isosceles right angle prism secured thereto as set forth for said first and second rhombohedrons;
   a wedge secured to one face of each of said third and fourth rhombohedrons with said wedges facing said first and second rhombohedrons and arranged so that said wedges receive radiation from said first and second rhombohedrons and said third and fourth beam splitting ends receive radiation from said wedges;
   an objective lens positioned to receive combined radiation emerging from said third and fourth rhombohedrons;
   a Ronchi ruling positioned at the appropriate image plane of said objective lens to receive radiation therefrom; and
   a detector-recorder for detecting and recording a signal from said Ronchi ruling.

2. A compact three-beam interferometer as claimed in claim 1 wherein:
   said wedges are adjustable relative to said third and fourth rhombohedrons.

* * * * *